July 8, 1969    A. J. SHALER    3,454,803

BRUSH HOLDER FOR ACCOMMODATING LONGER BRUSHES

Filed May 7, 1968    Sheet 1 of 2

INVENTOR
AMOS J. SHALER

BY
Brown, Critchlow, Flick & Peckham
ATTORNEYS.

July 8, 1969  A. J. SHALER  3,454,803
BRUSH HOLDER FOR ACCOMMODATING LONGER BRUSHES
Filed May 7, 1968  Sheet 2 of 2

INVENTOR
AMOS J. SHALER

BY
Brown, Critchlow, Flick & Peckham
ATTORNEYS.

United States Patent Office 3,454,803
Patented July 8, 1969

3,454,803
BRUSH HOLDER FOR ACCOMMODATING LONGER BRUSHES
Amos J. Shaler, State College, Pa., assignor to Stackpole Carbon Company, St. Marys, Pa., a corporation of Pennsylvania
Filed May 7, 1968, Ser. No. 727,151
Int. Cl. H02k *13/12;* H01r *39/40*
U.S. Cl. 310—245         6 Claims

ABSTRACT OF THE DISCLOSURE

This invention relates to a brush holder for slidably supporting a current conducting brush in a rotary electrical machine, such as a motor or generator, and for urging the brush inwardly against a rotating collector adjacent the inner end of the holder. The holder includes a tubular cartridge having a brush-receiving channel that is open at its inner end, and disposed therein is a ribbon-like rolled constant-pressure spring having outer and inner end portions and an intermediate portion. The outer end portion of the spring is secured near the inner end of the channel and to one side thereof; the inner end portion is substantially flat and is sharply and permanently bent relative to the intermediate portion; and the intermediate portion tends to roll itself into a hollow coil with the flat inner end portion disposed substantially along a radius of the coil and having its tip near the center of the coil. The spring is capable of being uncoiled with its intermediate portion extending as a substantially flat ribbon along a side wall of the channel and with its inner end portion extending transversely of the channel at its outer end. The spring is initially maintained in such extended position by the insertion of a brush in the channel between the spring and the opposite channel wall with the brush extending substantially the full length of the channel so that the outer end of the brush is spaced from the outer end of the channel only by the thickness of the flat inner end portion of the spring.

Background of the invention

Of the many millions of electric motors now being annually incorporated into new appliances for home and industry, a great majority are considered to have failed beyond repair and are scrapped (and often the entire appliance scrapped as well) when any one of the vital motor components fails. In the past, such failures often resulted from gradual loss of insulation on the electrical windings; nowadays, the insulation seldom fails. In the past also, the bearings of fractional horsepower motors would wear to the point that they became so loose on the shaft that vibration and consequently accelerated wear caused the motor to fail; modern bearings, however, are made of better materials and so designed that these failures are less likely to occur. As a result, most modern appliances are and will be scrapped when their motors cease to operate because of the wearing out of their brushes. Accordingly, means for extending the useful brush life of motors and generators has become increasingly important in modern technology. Because economy dictates that the diameter of an electric motor or generator be as small as possible and because brush holders extend radially, it is not practicable to increase the length of the holder to accommodate a longer brush. So the present invention is predicated on providing a brush of maximum length in a given brush holder.

Brush holders of the cartridge type usually include a barrel extending the maximum possible radial distance, i.e., from near the surface of the rotating collector to the outside of the housing of the electrical machine. Into a radial passage this barrel must fit not only the brush but also the spring means for applying pressure to the outer end of the brush to urge it against the collector. A common form of spring means used in present brush holders is a ribbon-like rolled constant-pressure spring that tends to roll itself up into a coil. As presently used, the outer end of the spring is fastened to the inner end of the passage and the spring is partially unrolled as a flat ribbon along the inner wall of the passage and held there by a new brush that is inserted in the holder, the outer end of the brush being spaced from the outer end of the passage by a full coil of the spring. Since the coil is only slightly smaller in diameter than the width of the brush passage, a considerable portion of the radial space in the holder is taken up by the spring means, leaving less space for the brush. If most of the radial space so occupied by the spring were available for the brush, the holder would accommodate a longer brush without any increase in the overall length of the holder. This would result in longer effective brush life.

It is accordingly among the objects of this invention to provide a brush holder that will incorporate a constant-pressure spring for urging one end of the brush against a rotating collector and that will accommodate a longer brush for a given length of holder as compared to holders now available. Other objects of the invention will be apparent from the following description of a preferred embodiment in connection with the attached drawings.

The drawings

Description of the invention

Figure 1:
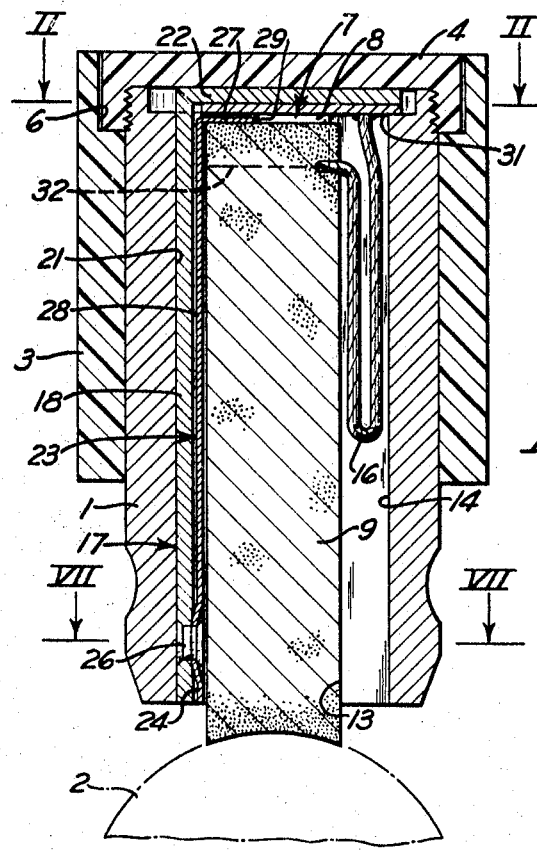
FIG. 1 is a vertical section of the brush holder of this inventioin, showing the initial disposition therein of a current conducting brush and spring.

Referring to the drawings, the brush holder of this invention includes a tubular barrel 1, which may be made of brass or other metal, mounted with its inner end adjacent to a rotating cylindrical collector 2, such as a commutator or slip ring of an electrical machine (not shown). The outer surface of the barrel may be suitably insulated, as by a nonconducting cylindrical sleeve 3 and cap 4, the latter being threaded onto the outer end of the barrel and fitting into an annular rabbet 6 on the edge of the sleeve. Extending entirely through the barrel is a passage 7 of irregular cross section (see FIG. 2). The central portion of this passage forms a brush receiving channel 8 for slidably receiving a conducting brush 9 having a rectangular cross section. The opposed channel walls 11 and 12 confine two opposite sides of the brush. The third side of the brush is confined by the shoulders 13, the space between those shoulders defining a lateral portion 14 of passage 7. This lateral portion is provided to accommodate a braided electrical lead 16 having one end attached to the brush. Opposed to the fourth side of the brush is a mounting piece 17, which may be a metal strip of about the same width as the brush and bent to form an inverted L (see FIG. 1). The longitudinal portion 18 of this mounting piece may have bevelled vertical edges 19, so that the mounting piece can be slidably inserted and retained in a mating bevelled slot 21 that is also part of the passage 7 through the barrel. The outer end of the barrel is counterbored to permit the horizontal or top portion 22 of the mounting piece 17 to be fitted into and flush with the outer edge of the barrel.

A ribbon-like rolled constant-pressure spring 23 of about the same width as the brush 9 has its outer end portion 24 secured, as with rivets 26, to the inner side of the mounting piece 17 near the bottom of the latter. The spring has a substantially flat inner end portion 27 that is sharply and permanently bent at right angles to an intermediate portion 28, the latter extending between the two end portions. The intermediate portion is of the type that is unstressed in the coiled up state and stressed when stretched out straight. When the outer end portion of the spring is fastened to the mounting piece as described above, the intermediate portion tends to roll itself into a hollow coil with the inner end portion extending along a radius of the coil and with the tip 29 of that portion approximately at the coil's center (see FIGS. 5 and 6). In other words, the flat inner end portion of the spring has a length substantially equal to the radius of the inner coil of the spring.

Figure 2:
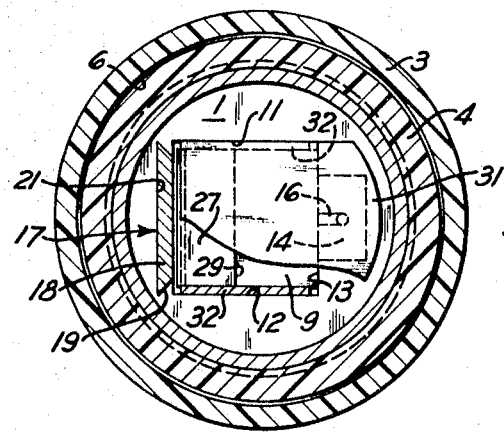
FIG. 2 is a horizontal section of the brush holder along the line II—II of FIG. 1.

Initially, the spring 23 is fully uncoiled so that its entire intermediate portion 28 extends as a substantially flat ribbon along the inner surface of the longitudinal portion 18 of mounting piece 17, as shown in FIG. 1. When so extended, the spring has an inverted L-shape, with its inner end portion 27 positioned substantially normal to the adjacent intermediate portion and extending transversely about half way across the outer end of the brush receiving channel 8. The spring is initially held in this extended position by the insertion of a new brush in the holder, the brush being free to slide longitudinally in channel 8, the longitudinal walls of which are defined by the uncoiled intermediate portion 28 of the spring and by the shoulders 13 and the opposed walls 11 and 12 of the barrel. The outer end of this channel is defined by a thin contact piece 31 in the form of a conducting metal disc, which may be provided with depending spring skirts 32 for making electrical contact with the barrel 1. One end of the flexible conducting braid 16 is soldered to this contact piece and further electrical connection between the barrel 1 and the electrical machine (not shown) is made in the usual manner.

It will be apparent from FIG. 1 that, when a new brush is fully inserted in the holder with the spring in its extended position, the outer end of the brush is separated from the outer end of channel 8 solely by the thickness of the inner end portion 28 of the spring overlying the outer end of the brush. Since a suitable spring may have a thickness of around 1/1000 of an inch, the brush for all practical purposes may initially extend the full length of the brush receiving channel.

Figure 3:
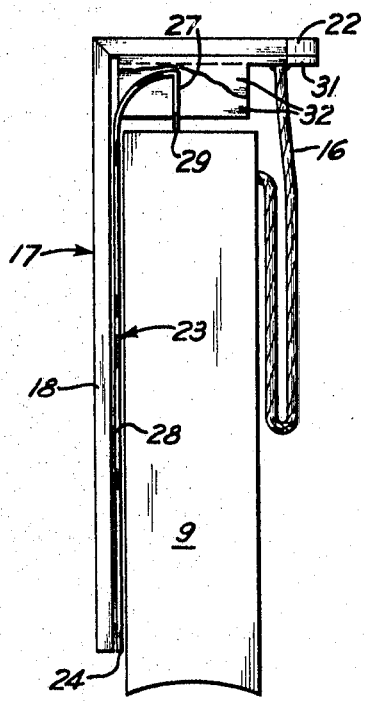
FIG. 3 is a fragmentary elevation of a portion of the device in FIG. 1, showing the position of the brush and the spring after the brush has been slightly worn.
Figure 4:
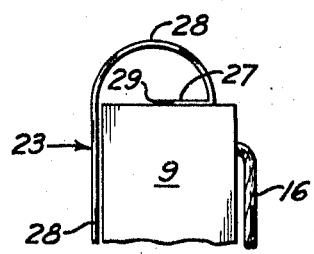
FIG. 4 is a fragmentary elevation of a portion of FIG. 3, showing the position of brush and spring after the brush has been further worn.
Figure 5:
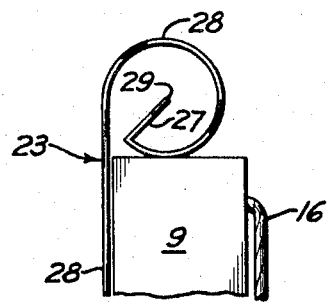
FIG. 5 is similar to FIG. 4, showing the position of brush and spring when the brush is worn still further.
Figure 7:
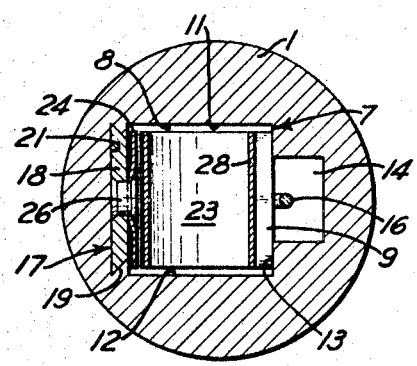
FIG. 7 is a horizontal section of the brush holder along the line VII–VII of FIG. 1, but with the brush and spring in the positions shown in FIG. 6.
Figure 6:
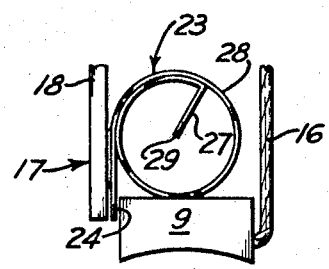
FIG. 6 is also similar to FIG. 4, showing the position of brush and spring when the brush has been substantially completely worn.

In its extended position, the tip 29 of the inner end of the spring overlies the outer end of the brush and extends substantially to the central axis of the brush, exerting pressure at that point to urge the brush radially inward against the commutator 2. As the brush gradually wears, becoming shorter, the flat inner end portion of the spring turns in a clockwise direction about its tip (as viewed in the drawings), gradually assuming the vertical position shown in FIG. 3, with its tip 29 still near the central axis of the brush. As the brush continues to wear, the spring continues to coil itself about a center defined approximately by the tip 29, and this center moves radially inward substantially along the central longitudinal axis of the brush. At one point, as shown in FIG. 4, the spring has formed half of a first coil, and the flat inner end portion 27 overlies the outer end of the brush, but in an inverted and reversed position relative to its position in FIG. 1. From this point on, as the brush continues to wear, the top of the brush is contacted by the intermediate portion 28 of the spring, that is, by the lower outer helical surface of the outer coil of the spring as shown in FIGS. 5 and 6. When the brush is completely worn, with only a minimum length supported in the channel of the brush holder, the parts are in the relative positions shown in FIGS. 6 and 7.

Obviously, some of the elements described in connection with the preferred embodiment of this invention may be dispensed with. For example, the electrical contact piece 31 is not essential and a satisfactory electrical connection can be made between the brush and the barrel 1 by other and well known means. In addition, the mounting piece 17 need not have the transverse top portion 22 and, in fact may be dispensed with altogether. The elimination of the contact piece 31 and the transverse portion 22 of the mounting piece 17 will, of course, increase slightly the radial length of the brush receiving passage, thereby permitting the use of a slightly longer brush. Although the mounting piece 17, particularly the longitudinal portion 18, provides a convenient means for uncoiling the spring outside of the holder and then inserting it and a new brush into the holder, the mounting piece can be dispensed with entirely. In such case, the outer end portion of the spring would be fastened directly to the barrel at the inner end of the brush receiving channel.

It will be noted that the overall transverse diameter of the spring when fully coiled (as shown in FIG. 6) is less than the transverse thickness of the brush, thereby permitting the spring to coil freely from its extended to its fully coiled position and to exert a substantially constant pressure against the top of the brush. Although the present embodiment of the invention described herein shows only a single coil spring, it will be readily apparent that two opposed springs of the same type as herein described could be used, each of which has a fully coiled diameter less than half the transverse dimension of the brush. Such a pair of opposed springs would have the same structural characteristics and function in the same manner as the spring 23 herein described, the only difference being that the two springs would form smaller coils and would contact the brush along two parallel lines at the top of the brush on either side of its central axis, as compared with the single line contact at the central axis of the brush as exemplified by the illustrated embodiment of this invention.

It is among the advantages of the present invention that brush length and therefore effective brush life are significantly extended over that prevailing with conventional brush holders using a constant pressure rolled spring. Even in those cases where brush life is not of primary importance, the brush holder of this invention can be shorter and still accommodate the same length of brush that is used in conventional holders, thereby permitting a decrease in the overall diameter of the motor without shortening brush life.

I claim:

1. A brush holder for slidably supporting a current conducting brush in a rotary electrical machine and for urging the brush inwardly against a rotating collector adjacent the inner end of the holder, said holder comprising: a tubular cartridge having a brush-receiving channel therein that is open at its inner end, a ribbon-like rolled constant-pressure spring having outer and inner end portions and an intermediate portion, the outer end portion being secured relative to the holder near the inner end of the channel and to one side thereof, the inner end portion being substantially flat and sharply and permanently bent relative to the intermediate portion, and the intermediate portion tending to roll itself into a hollow coil with the inner end portion disposed substantially along a radius of the coil and having its tip near the center of the coil, the spring being uncoilable by a brush inserted in said channel from its inner end to straighten the intermediate portion of the spring into a substantially flat ribbon along a side wall of the channel with said flat inner end portion extending transversely of the outer end of the channel so that the outer end of the brush need be spaced from the outer end of the channel a distance substantially no greater than the thickness of said flat inner end portion.

2. A brush holder according to claim 1, including a rigid L-shape mounting piece disposed in said channel and having a flat strip-like body extending along one side of the channel and an end portion extending across the outer end of the channel, said intermediate portion of the spring extending along said mounting piece body when uncoiled, with said flat inner end portion of the spring extending part way across said end portion of the mounting piece.

3. A brush holder according to claim 1, in which the flat inner end portion of the spring is bent substantially at right angles to the adjacent intermediate portion, whereby the spring is L shape when uncoiled.

4. A brush holder according to claim 1 that also includes a longitudinal mounting piece in the form of a flat strip mounted in the cartridge at one side of the brush receiving channel, the outer end portion of the spring being fastened to the mounting piece adjacent the inner end of said piece.

5. A brush holder according to claim 4, in which the mounting piece is keyingly mounted in the cartridge to permit only longitudinal movement between the mounting piece and cartridge.

6. A brush holder according to claim 1, in which the spring when fully coiled in the brush receiving channel about its inner end portion has an overall diameter less than the transverse dimension of the brush.

References Cited

UNITED STATES PATENTS

| | | | |
|---|---|---|---|
| 2,695,968 | 11/1954 | Welch et al. | 310—247 |
| 2,683,829 | 7/1954 | Gerber | 310—246 |

MILTON O. HIRSHFIELD, *Primary Examiner.*

G. P. TOLIN, *Assistant Examiner.*

U.S. Cl. X.R.

267—1